United States Patent [19]

Gates et al.

[11] Patent Number: 5,026,673

[45] Date of Patent: Jun. 25, 1991

[54] STABLE ZEOLITE-SUPPORTED TRANSITION METAL CATALYSTS, METHODS FOR MAKING THEM, AND USES THEREOF

[75] Inventors: Bruce C. Gates, Newark, Del.; Pei-Ling Zhou, Beijing, China

[73] Assignee: University of Delaware, Newark, Del.

[21] Appl. No.: 370,599

[22] Filed: Jun. 23, 1989

[51] Int. Cl.$^5$ .................. B01J 29/04; B01J 31/20
[52] U.S. Cl. ........................... 502/62; 502/74
[58] Field of Search ................. 502/66, 74, 62

[56] References Cited

U.S. PATENT DOCUMENTS

| | | | |
|---|---|---|---|
| 3,013,984 | 12/1961 | Breck | 502/79 |
| 3,013,987 | 12/1961 | Castor et al. | 502/74 |
| 3,013,990 | 12/1961 | Breck et al. | 502/74 |
| 4,294,725 | 10/1981 | Fraenkel et al. | 502/74 |

OTHER PUBLICATIONS

P. Fejes et al, in *Catalysis by Zeolites*, ed. Imelik et al., Elsevier, Amsterdam, 1980, pp. 135–140.
L. Martens et al, *Proc. 9th Int'l Congress on Catalysis*, vol. 1, ed. Phillips et al, 1988, pp. 420–428.
L. Martens et al, *Stud. Surf. Sci. Catal.* 28, 935–941 (1986).
L. Martens et al, *Nature* (London), 315, 568 (1985).
Union Carbide trade lit., "LINDE Molecular Sieves: Zeolite Catalyst Data" (Catalyst Base LZ-Y52 Powder), published prior to 8-17-87.

*Primary Examiner*—Carl F. Dees

[57] ABSTRACT

It has been found that strongly basic molecular sieves can be used to make stable, relatively selective catalysts for reactions between carbon- and hydrogen-containing species if the strongly basic molecular sieve is combined with a volatile transition metal carbonyl compound. Although the volatile transition metal compound preferably contains initially only a single transition metal atom, clusterification can convert this compound to a compound or ion of the formula $$H_a M_b (CO)_c \qquad (I)$$

where a, b, and c are nubers greater than zero but no more than about 15, 1 to 2 being typical for a and 3 to 4 being typical for b. The polynuclear (i.e. poly-metal atom) compounds of formula (I) are believed to be trapped within "supercages" of the molecular sieve structure. To obtain the strongly basic molecular sieve used as a starting material for making the catalyst, the molecular sieve is treated with an alkali metal azide and the azide is then decomposed. Catalysts of this invention are particularly useful in, for example, methods for making hydrocarbons from $CO/H_2$ mixture at elevated temperatures (e.g. 250°–450° C.) and pressures (e.g. $\geq 10$ bar). Hydrocarbon products rich in low molecular weight alkenes can be obtained in this manner.

15 Claims, No Drawings

STABLE ZEOLITE-SUPPORTED TRANSITION METAL CATALYSTS, METHODS FOR MAKING THEM, AND USES THEREOF

FIELD OF THE INVENTION

This invention relates to molecular sieve-supported transition metal (e.g. Group VIII metal) catalysts obtained by introducing vapor from a volatile transition metal compound into the intracrystalline space of a basic molecular sieve. An aspect of this invention relates to a stable, selective catalyst for the formation of hydrocarbons from carbon monoxide and hydrogen or the hydroformylation of alkenes or other reactions or transformations taking place at temperatures as high as 300° C. and higher. Another aspect of this invention relates to a catalyst for converting carbon monoxide and hydrogen into a mixture of hydrocarbons which is rich in lower alkenes. Still another aspect of this invention relates to a basic molecular sieve zeolite-supported Group VIII metal catalyst which provides a high level of catalytic activity for a long period of time and which resists migration of the Group VIII metal compound from the molecular sieve zeolite structure while the catalyst is in use.

DESCRIPTION OF THE PRIOR ART

It is well known to use transition metals, particularly metals of Group VIII of the Periodic Table (and their compounds) in the catalysis of the reactions for the formation, modification, or isomerization of hydrocarbons. For example, the well-known Fischer-Tropsch synthesis converts synthesis gas to a variety of products, many of which have commercial interest. Depending on the choice of catalyst and reaction conditions, the products can be linear hydrocarbons, oxygenated derivatives, or mixtures of both. Usually, a wide range of molecules with $C_1$-$C_{30}$ chain lengths are formed. In commercial versions of the Fischer-Tropsch synthesis, alkalized iron catalysts have been used successfully, but the distribution of hydrocarbon products is not as advantageous as might be desired from a commercial standpoint. For example, yields of lower hydrocarbons and particularly low molecular weight alkenes are low compared to high molecular weight waxy materials and liquid alkanes.

Synthesis gas (typically a 1:1 molar ratio of CO and $H_2$ obtained, for example, from the endothermic reaction of carbon with steam) is potentially one of the cheapest feedstocks available, despite the capital-intensive equipment needed for its manufacture. Almost any source of elemental carbon can be used to make this gas, including petroleum, natural gas, coal, and even organic waste material. Thus, although the Fischer-Tropsch synthesis has not been widely used in commercial practice, the use of coal as a potential source for producing chemical feedstocks appears to have great commercial potential, particularly if the yield of low-molecular weight alkenes can be maximized (at the present time, ethylene and propylene are still being made by cracking high molecular weight hydrocarbons or by dehydrogenation of lower alkanes, particularly ethane.)

In an attempt to maximize the yield of lower alkenes from the hydrogenation of carbon monoxide, researchers have used molecular sieve zeolites as supports for catalytic metals, attempting to impose a shape selectivity on the catalysis or to control the performance through particle size effects. See, for example, Fraenkel et al, *J. Am. Chem. Soc.*, 102, 2478 (1980) and Jacobs et al, *J. Catal.*, 65, 328 (1980). These attempts have been partially successful, yielding unusual distributions of products (e.g., high yields of $C_3$ or $C_4$ hydrocarbons), but the catalysts have been unstable, because the zeolite pores have been plugged with products or because the metal has been oxidized or has migrated out of the zeolite "cages" (intracrystalline spaces) to form larger aggregates. The larger aggregates tend to provide only the conventional product distribution. See Bein et al, *J. Phys. Chem.*, 90, 4851 (1986); c.f. Nazar et al, *J. Mol. Catal.*, 21, 313 (1983).

The crystalline structures of molecular sieves, including zeolites (aluminosilicates) and aluminophosphates have been studied extensively and in some cases are well understood. Zeolites have been used in molecular sieve technology because of the relatively uniform, predictable size of the sub-microscopic pores in the zeolite structure. The typical zeolite molecular sieve has a rather open structure in which metals or metalloids such as aluminum and silicon are surrounded by complex arrangements of oxygen atoms. In the case of silicon and aluminum, the most fundamental repeating unit of the zeolite structure is a tetrahedron, and silica and alumina tetrahedra can be linked together to form more complex structures. The unit-cell dimension of a particular zeolite such as zeolite Y varies with the Si/Al ratio, and this unit cell typically defines internal cavities in some zeolites, e.g. the faujasites, including "supercages" and smaller sodalite cages, which can be accessed through relatively smaller pore apertures. Despite the fact that the supercage in some zeolites is relatively large compared to the apertures, an entire supercage is still well within typical molecular size ranges, i.e. the sizes of small and large monomeric molecules and relatively small oligomeric or polymeric molecules. Thus typical pore diameters are less than 20 Ångstrom units (2 nm) and most typically smaller than 10 Angstroms (1 nm). In addition there may be other openings into the cage or supercage which are smaller than normal pore size and thus cannot serve as routes of access to the supercage, because few if any of even the smallest molecules will be able to pass through them.

In a typical zeolite, cations within the open structure can be exchanged with other cations, for example, as hydrogen ions are replaced by sodium ions. Such an exchange convents an acidic zeolite into one that is basic. Moreover, zeolites can be rendered strongly basic by introducing alkali metals or the like in essentially neutral (non-ionic or elemental) form. One of the best techniques for introducing sodium into a zeolite structure involves dissolving $NaN_3$ in a suitable solvent, contacting the zeolite with the solution so that it can penetrate the pores and be introduced into the interior of the supercages, evaporating off the solvent, and thermally decomposing the $NaN_3$. This technique has been described in several references including, for example, Martens et al, "Sodium Clusters in Large Pore Zeolites as Basic Catalysts" in *Proceedings, 9th International Congress on Catalysis*, Ed., M. J. Phillips et al, Vol. 1, 420–428 (1988); Martens et al, *Stud. Surf. Sci. Catl.*, 28, 935 (1986); Martens et al, *Nature(London)* 315, 568 (1985). Studies of the structure of the resulting strongly basic catalyst suggest that alkali metal clusters are formed inside of the zeolite cages when the sodium azide is thermally decomposed. These clusters, which may be ionic or neutral or combinations of ions and uncharged atoms, e.g. $Na_4^{+3}$, appear to be trapped within the sodalite cages of faujasite zeolites and cannot migrate out through the pores. Prior to thermal decomposition, however, the dissolved sodium azide molecules enter the supercages through the pores rather easily.

Shape-selective Fischer-Tropsch catalysts comprising a particulate synthetic zeolite incorporating a transition metal catalyst (e.g. a metal of Group VIII of the Periodic Table) are known in the art. Synthetic A zeolites are especially well known for shape-selective properties and ion-exchange capabilities, although Y zeolites have also been suggested for use as catalysts. A transition metal salt in solution can impregnate even the relatively small pores of zeolite A, and, after exchanging with cations inside the zeolite structure (if necessary) and after reduction of the transition metal in situ, the transition metal is in the form of small, mostly neutral or partially reduced clusters which are, to some degree, trapped within the tiny (<10 Ångstrom) zeolite pores and cannot easily migrate through intracrystalline channels to the space outside of the zeolite structure. See U.S. Pat. No. 4,294,725 (Fraenkel et al), issued Oct. 13, 1981. Nevertheless, migration of the transition metal can be a serious problem even when the transition metal atom clusters are initially trapped in the manner disclosed by Fraenkel et al. When migration occurs, the metal atom clusters become sintered, and catalytic activity and/or selectivity is lost. Chemists skilled in the art of Fischer-Tropsch catalysis refer to such catalysts as "unstable"; that is, such catalysts cannot maintain some of their most important properties while they are in use, particularly at elevated temperatures.

BRIEF SUMMARY OF THE INVENTION

It has now been discovered that certain basic zeolites are capable of entrapping transition metal carbonyl species (presumably by, inter alia, ionic interactions with a metal carbonyl compound), such that the metal carbonyl species cannot be extracted readily from the zeolite; moreover, when the resulting basic zeolite-supported transition metal catalyst is heated to elevated temperatures (e.g. during the carbon monoxide hydrogenation reaction), it appears that the transition metal carbonyl species, even if previously containing only a single metal atom undergo a cluster formation reaction to become polynuclear. The polynuclear carbonyl compound or ion or ion/compound combination is controlled in its size through the constraints of the space available in the zeolite cage but is apparently too large to pass through the apertures to migrate from the intracrystalline space in the zeolite.

It appears to be very important to this discovery that the zeolite be strongly basic, not acidic, neutral, or even mildly basic. The preferred starting material for the strongly basic zeolite is of the faujasite family (e.g. zeolite Y or, even more preferably, NaY). Zeolite Y is acid-resistant and thermally stable up to approximately 700° C. and has a Si/Al ratio greater than 3. In its hydrogen form, it is an acidic zeolite, and in its sodium form it is a nearly neutral or moderately basic zeolite known for its shape selectivity. The various forms of zeolite Y have good ion-exchange properties and are easily converted to zeolite NaY. The degree of basicity required of a zeolite used to prepare catalysts of this invention cannot easily be quantified. The best way to insure sufficient basicity is to treat the faujasite zeolite with sodium azide ($NaN_3$) in accordance with the technique of Martens et al, described above. After this treatment, it appears that the faujasite zeolite contains clusters of sodium atoms (which may include some sodium ions also) which may be enclosed within sodalite units (cages) having diameters in the range of about 6.6 Ångstrom units (0.66 nanometers (nm)), which sodalite cages are accessible via openings with diameters of about 2.6 Ångstrom units (0.26 nm). The internal diameters of the supercages in zeolites typically range from about 0.5 to about 1.5 nm, preferably about 1.0 to about 1.5 nm, and the largest openings into the supercages typically have a longest dimension greater than about 0.6 nm but less than about 8.5 nm.

Preferred transition metals used in this invention to prepare the basic-zeolite-supported transition metal catalyst are metals of Group VIII of the Periodic Table and other transition metals which form volatile compounds such as carbonyl compounds. In addition, it is important that the transition metal carbonyl compound be a Brønsted acid. Accordingly, transition metals which form volatile transition metal carbonyl hydrides of Brønsted acidity, even though it may be weak, are selected for use in this invention. Metals of the third triad of Group VIII (e.g. osmium) have this capability. Metals of the first triad of Group VIII (Fe, Co, and Ni) are of the greatest commercial interest.

A transition metal catalyst of this invention can be prepared by bringing the vapor of the volatilized transition metal carbonyl hydride into contact with the alkali metal azide-treated zeolite. In the reaction between the alkali metal azide-treated zeolite and the metal carbonyl hydride vapor, the strongly basic zeolite can be considered to be a base with the property of reacting with the metal carbonyl hydride in such a manner as to abstract or partially abstract a proton from it. The resulting metal carbonyl anion presumed to be formed appears to be ionically bonded to the zeolite structure, because ordinary extraction techniques do not appear to remove any transition metal species from the reaction product. Upon heating of this basic zeolite/metal carbonyl reaction product to elevated temperatures (e.g. at least about 100° C.), it appears that changes in the transition metal carbonyl molecular or ionic structure occur, resulting in the formation of a species (apparently ionic) containing approximately three or four transition metal atoms.

Zeolite-supported transition metal catalysts of this invention are useful in a variety of processes, particularly processes in which the catalyst comes in contact with elemental and/or combined forms of carbon oxides and hydrogen in a fluid (e.g. gaseous) state. The zeolite-supported metal carbonyl species behaves as a heterogeneous catalyst and therefore can be utilized in the form of a fixed or fluidized bed. The fluids fed to the catalyst bed can be hydrocarbons which are to be isomerized or subject to hydroformylation. A particularly important use of the catalyst relates to reactions between carbon monoxide and hydrogen (e.g. in a 1:1 molar ratio) for the production of hydrocarbons, particularly low molecular weight alkenes. Catalysts of this invention provide a product stream rich in such alkenes and also provide long term catalytic stability.

DETAILED DESCRIPTION

Although this invention is not bound by any theory, it is presently believed that the long-term resistance to migration of the transition metal or transition metal carbonyl species from the zeolite support is at least partly a function of the size of the metal carbonyl species trapped within the supercages of the zeolite and perhaps also a function of the strength of the ionic interaction or bonding within the zeolite structure. In a series of experiments designed to elucidate the nature of this invention, it was found that long-term stability of the type provided by this invention could not be obtained with nearly neutral or moderately basic zeolites. Moreover, at room temperature, a significant amount of anchoring of the transition metal was found, rendering the metal carbonyl/zeolite combination resistant to extraction of the metal carbonyl species. Thus, the freshly prepared catalyst appears to have built-in properties of stability even before it is put to use. It is theorized that use of the catalyst (or heating of the catalyst to the temperature of use for reactions such as the Fischer-Tropsch synthesis) further stabilizes the catalyst rather than stimulating the factors which may lead to migration of the transition metal from the zeolite structure. For example, it is theorized that the metal carbonyl species bonded to the basic zeolite at room temperature can contain a single metal atom, whereas the species formed by clusterification (e.g. by heating to elevated temperatures such as about 250° C. or more in the presence of CO) from this mono-metallic species contains three or four metal atoms and are thus too large to migrate through the apertures to the supercages of the zeolite. In addition, the metal carbonyl species is hypothesized to be anionic, and there may still be an ionic bonding holding the metal carbonyl species in place.

It is believed that the polynuclear metal carbonyl species formed in situ in the supercages is a compound or ion such as $H_a M_b(CO)_c$, wherein a, b, and c are numbers greater than 0 but no more than about 15; a and b appear to be in the range of about 1-5, 3 to 4 being most typical for b and 1-2 being most typical for a. These species can be in the shape of a sphere, a prism or a tetrahedron. An octahedral structure is believed to be less likely, at least in the case of faujasite-supported catalyst.

The supercage of the zeolite is believed to govern the size of the polynuclear (i.e. poly-metal atom) species trapped in the cage. That is, a species having a dimension too large to fit inside the cage will not be formed, regardless of the temperature to which the zeolite/metal carbonyl combination is heated.

ZEOLITE STARTING MATERIALS

As noted previously, the preferred starting material is a Faujasite zeolite such as zeolite Y or more preferably MY, particularly NaY. It is known that NaY zeolite in the form of a powder can be treated with an alkali metal azide such as $NaN_3$ in the method of Martens et al.

The unit cell of the faujasite-type of zeolites is cubic with a unit-cell dimension of 25 Ångstrom units (2.5 nm) and contains 192 silica and alumina tetrahedra. The unit-cell dimension can vary with the Si/Al ratio which is typically at least about 3:1, more typically larger than 3:1. Each sodalite unit in the structure is connected to four other sodalite units by six bridge oxygen ions connecting the hexagonal faces of two units. The truncated octahedra are stacked like carbon atoms in a diamond. The oxygen bridging unit is referred to as a hexagonal prism, and it may be considered another secondary unit. This structure results in a supercage (sorption cavity) surrounded by ten sodalite units which are sufficiently large for an inscribed sphere with a diameter of 12 Ångstrom units (1.2 nm). The opening into this large cavity is bounded by six sodalite units resulting in a 12-membered oxygen ring with a 7.4-Å (0.74 nm) free diameter. Each cavity is connected to four other cavities, each of which in turn is itself connected to three additional cavities to form a highly porous three-dimensional framework structure.

This framework structure is one of the most open of the zeolites and is about 51% void volume, including the sodalite cages; the supercage volume represents about 45% of the unit-cell volume. The main pore structure is 3-dimensional and large enough to admit large molecules, e.g. naphthalene and fluorinated hydrocarbons. A secondary pore structure involving the sodalite units exists, as in zeolite A, but its apertures are too small to admit most molecules of interest in catalysis. See Gates et al, *Chemistry of Catalytic Processes,* McGraw-Hill, 1979, page 54.

The Y zeolite is an alumino-silicate whose structure may be looked upon as a large matrix of oxygen anions, since the small silicon and aluminum ions are effectively shielded from interaction with species in the pore structure by oxygen anions tetrahedrally surrounding them. (This is also true of the X zeolite.) This structure carries a charge per unit cell equivalent to the number of aluminum-containing tetrahedra per unit cell. The charge is partially delocalized over the entire framework structure. When the cations in the structure which preserve electrical neutrality are protons, the structure is acidic, but ion exchange is possible, and these protons can be replaced with metal cations having a charge of +1, +2, or +3. When the metal cation is sodium, the zeolite is typically referred to as NaY. The number of cations per unit cell varies depending upon the Si/Al ratio. Accordingly, zeolite NaY is a sodium alumino-silicate and has a crystalline structure with uniform distribution of cation exchange sites. Zeolite NaY is not sufficiently basic for use in this invention and should be made strongly basic, e.g., by the Martens et al technique described previously. Prior art workers have shown that the compound $[H_2Os(CO)_4]$ will react with the basic surface of MgO to provide high yields of stable species containing osmium and carbonyls bonded to the osmium. See, for example, H. H. Lamb et al, *J. Am. Chem. Soc.,* 108, 81 (1986) and *Proc. 9th Int. Cong. Catal.,* 3, 1378 (1988) or *Angew. Chem.,* 27, 1127 (1988). Although this invention is not bound by any theory, it is believed that the compound $[H_2Os(CO)_4]$ reacts with the basic ($NaN_3$-treated) zeolite to form, inter alia, an anion such as $[HOs(CO)_4]^-$.

The particularly preferred NaY zeolite used in this invention is known by the commercial designation Catalyst Base LZY-52, a molecular sieve provided by the Linde division of Union Carbide Corp. This zeolite is supplied as a powder with a surface area, by the B.E.T. method, of about 900 m$^2$/g. The unit cell size is reported to be 24.7 Ångstrom units. The $SiO_2/Al_2O_3$ molar ratio is reported to be 4.74, and the $Na_2O/Al_2O_3$ molar ratio is reported to be 0.93. According to a typical analysis, this zeolite contains the equivalent of 63.8% by weight of $SiO_2$, 22.9% by weight of $Al_2O_3$, and 13.0 wt.-% of $Na_2O$. Other oxides may be present, but in amounts less than 0.5 wt.-%, e.g. 0.13 wt.-% $Fe_2O_3$ and 0.38 wt.-% CaO. Accordingly, this particular commercially available zeolite has rather high purity.

FORMATION OF THE BASIC ZEOLITE

In accordance with the method of Martens et al, the starting NaY powder is converted to a strongly basic zeolite with the aid of an alkali metal azide such as $NaN_3$. The NaY powder is calcined in flowing oxygen (extra-dry grade) at 673K (400° C.) for two hours, followed by evacuation ($10^{-3}$ to $10^{-4}$ Torr) for 12 hours. The $NaN_3$ should be pure (of reagent grade) and should be dissolved in a suitable solvent such as a lower alkanol, but the lower alkanol should be dehydrated to preserve anhydrous reaction conditions. Crystalline, ground $NaN_3$ is dissolved in the anhydrous alcohol (e.g. methanol) and the calcined NaY is then slurried with this solution with continuous stirring at room temperature. After removal of the solvent and drying of the $NaN_3$-treated zeolite, thermal decomposition of the $NaN_3$ is brought about by heating under a protective inert gas atmosphere (e.g. nitrogen). This thermal decomposition can take place at 250–400° C. The resulting basic zeolite was characterized by infrared absorption bands at 2186 (m), 2076 (s), 2036 (vs), and 1973 (m) reciprocal cemtimeters ($cm^{-1}$).

CATALYTIC METALS

The catalytic metal must be selected for reactivity with CO, so that it will form a metal carbonyl. Moreover, the resulting metal carbonyl must include hydrogen e.g., be a metal carbonyl hydride. This metal carbonyl hydride should be easily volatilized at moderate temperatures, e.g. room temperature, without significant decomposition. Transition metals of, for example, Group VI-B can form metal carbonyl compounds, but the greatest variety of metal carbonyl compounds are formed by the metals of Group VIII, i.e. iron, cobalt, nickel, ruthenium, rhodium, palladium, osmium, iridium, and platinum. Because of their high level of availability and relatively low cost, metals of the first triad of Group VIII (Fe, Co, and Ni) are of great commercial interest. Of the second and third triads, osmium is of particular interest due to the work of Lamb et al on MgO, cited previously. Osmium reacts with CO to form several osmium carbonyls, including $[Os_3(CO)_{12}]$, which can be used to prepare the osmium carbonyl hydride $[H_2Os(CO)_4]$. (The catalyst of this invention shows surprising stability as compared to the catalyst prepared by Lamb et al, however, since Lamb et al reported a loss of 36% of the Os from their MgO-supported Os cluster catalyst during two days of operation.) Other known osmium carbonyl species include a variety of hydrides, and some are anions.

It is well known that metal carbonyl hydrides have Brønsted acidity. There is also literature support for the proposition that deprotonation of these hydrides can take place in the presence of bases to give anions.

Metal carbonyls are considered to be organometallic compounds. They can be reduced with alkali metals in a suitable anhydrous reaction medium (e.g., liquid ammonia) to form alkali metal-containing compounds capable of protonation with a mineral acid, thereby obtaining a metal carbonyl hydride. For example, $[Os_3(CO)_{12}]$ can be reduced with metallic sodium in liquid ammonia, followed by protonation of the resulting $[Na_2Os(CO)_4]$ with phosphoric acid. See J. P. Collman et al, *Inorg. Chem.* 13, 1 (1974). See also F. L'Eptattenier et al, *Inorg. Chem.* 6, 2092 (1967). The resulting $[H_2Os(CO)_4]$ can be dissolved in anhydrous organic solvents such as the liquid hydrocarbons. This osmium carbonyl hydride is a volatile compound at room temperature. In an article by H. W. Walker et al, *J. Am. Chem. Soc.* 105, 1179–1186 (1983) it is reported that $[H_2Os(CO)_4]$ was deprotonated in methanol, forming the singly-charged anion $[HOs(CO)_4]^-$. The osmium carbonyl hydride is an extremely weak Bronsted acid which requires an unusually strong Bronsted base for deprotonation, because the $pK_a$ in methanol has been determined to be 15.2. The deprontonation of $[H_2Os(CO)_4]$ on the surface of MgO was observed by H. H. Lamb et al, as noted previously, and the MgO surface is known to have a strong Bronsted basicity. Utilizing $B^-$ to represent the Bronsted base, the formation of the above-described anionic species can be described by equation (1a):

$$[H_2Os(CO)_4] + B^- \rightarrow [HOs(CO)_4]^- + BH \qquad (1a)$$

According to the literature, the anionic species produced in equation (1a) in protic media can undergo condensation to form the trinuclear anionic species $[HOs_3(CO)_{11}]^-$ *in accordance with equation (1b)*:

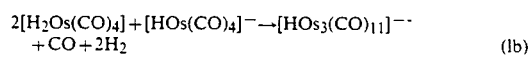

$$2[H_2Os(CO)_4] + [HOs(CO)_4]^- \rightarrow [HOs_3(CO)_{11}]^{--} + CO + 2H_2 \qquad (1b)$$

see J. C. Bricker et al, *OrganoMetallic* 3, 201 (1984). The observations of Bricker et al are believed to provide additional support for the conclusion that the osmium carbonyl species ultimately formed upon heating of the zeolite/osmium carbonyl combination to elevated temperatures is tri- or tetra-nuclear. (Species having a larger number of osmium atoms would probably not fit within the supercage.)

PREPARATION OF THE CATALYST FROM THE METAL CARBONYL AND THE ZEOLITE

The strongly basic ($NaN_3$-treated) zeolite was prepared in the manner described previously. The metal carbonyl hydride species was prepared by reduction of the metal carbonyl followed by protonation, also described previously. Since the metal carbonyl hydride is volatile at room temperature, it was cooled to a nonvolatile state by immersing a Schlenk tube containing this volatile compound in a trap filled with liquid nitrogen. The strongly basic zeolite in powder form was placed in a flask with suitable connections, so that vapor could be introduced into the flask and the flask could be evacuated prior to the introduction of a vapor. The Schlenk tube was provided with an outlet and an evacuated connecting tube was used to provide a pathway from the outlet of the Schlenk tube to the flask containing the zeolite. The zeolite was also initially cooled with a liquid nitrogen trap. After the flask and connecting line were evacuated, the liquid nitrogen trap was taken away from the Schlenk tube to allow the tube to warm up to room temperature. As the Schlenk tube warmed up, the metal carbonyl hydride began to volatilize and to transfer under vacuum from the Schlenk tube to the flask. Thus, the volatilization and transfer were conducted in vacuo. Because the flask was cooled, the metal carbonyl hydride adsorbed in the zeolite in it. After the zeolite had been reasonably well treated with the metal carbonyl hydride, the flask was removed from the liquid nitrogen trap and kept under agitation at room temperature for 24 hours to allow sufficient mixing. The adsorbed metal carbonyl hydride appeared to react with the strongly basic zeolite. Excess (presumably unreacted) metal carbonyl hydride can be removed from the reaction product by application of subatmospheric pressure. The resulting zeolite/metal carbonyl hydride combination was subjected to various types of characterization which are described subsequently. A comparison was made with an osmium carbonyl hydride adsorbed on MY and HY zeolites. Extraction studies were carried out and compared for the strongly basic zeolite/metal carbonyl hydride combination and the HY or MY analogs. All of these studies confirmed the importance of the strongly basic character of the alkali metal azide-treated zeolite.

CATALYTIC PERFORMANCE IN CO HYDROGENATION

It has been found that a zeolite-supported transition metal catalyst of this invention is active in catalyzing reactions between carbon monoxide and hydrogen at temperatures above about 250° C., more typically above about 300° C. Superatmospheric pressure also assists greatly in providing efficient catalysis. A pressure of at least about 10 bar is preferred, more typically at least 15 bar. Thus, the reaction rate at 573 K (300° C.) and 19 bar with a $H_2/CO$ molar ratio of about 1 was of considerable interest. Under these moderate conditions, catalysts of this invention can be kept on stream for more than 20 days with negligible to moderate losses of catalytic activity and selectivity. Compared to conventional Fischer-Tropsch catalysts, zeolite-supported catalysts of this invention were found to provide higher yields of $C_2$-$C_4$ hydrocarbons with higher alkene/alkane ratios. These results indicate that catalysts of this invention are active for CO hydrogenation and selective for conversion of $CO+H_2$ into low-molecular-weight hydrocarbon products with good stability of catalytic activity and selectivity. The space velocity can be at least about 10 mL/g of catalyst/min. Greater CO conversion can be obtained by increasing the temperature from 573 K (300° C.) up to 500° C. (773K), a particularly preferred temperature being in the range of about 320-370° C., e.g. 593-643 K. The catalyst of this invention appears to be tolerant of frequent changes in the process variables such as temperature, pressure, and feed composition.

Although superatmospheric pressure is desired, catalysts of this invention are operative at atmospheric pressure. The difficulty with atmospheric pressure appears to be a degree of deactivation of the catalyst which is avoided at higher pressures, particulary at 11 bar and higher. Moreover, increasing pressure leads to increasing CO conversions, although the alkene/alkane ratio may decrease due to alkane dehydrogenation. The alkene/alkane ratio for $C_2$ hydrocarbons dropped more sharply than for $C_3$ hydrocarbons with increasing pressure. The $H_2/CO$ molar ratio can be varied in accordance with techniques well known in the art. For example, this ratio can vary from 0.3 to 3.0. The proportion of alkanes tends to increase with increasing $H_2/CO$ molar ratio, most probably due to hydrogenation of alkenes. Nonetheless, the unusually high selectivities favoring alkenes characteristic of this invention were evident even at relatively high $H_2/CO$ ratios. The catalyst of this invention is useful even at $H_2/CO$ molar ratios as high as 9.0, in those situations in which a product stream high in alkenes is not preferred.

Hydroformylations, formation of aldehydes and alcohols from alkenes and synthesis gas, and carbonylations can be carried out by techniques well known to those skilled in the art using suitable catalysts of this invention.

The principles and practice of this invention are illustrated in the following Examples.

EXAMPLES

In the Examples which follow, the metal carbonyl and metal carbonyl hydride and/or anion species were treated and handled as organometallic compounds having high reactivity with air and moisture. Accordingly, air and moisture were excluded during synthesis of the catalysts, and any solvents used in any aspect of the synthesis, application, or characterization of catalyst materials were pretreated to meet these requirements. In these Examples, all temperatures are in degrees Kelvin (273 K = 0° C.) unless otherwise indicated.

A. PREPARATION OF BASIC ZEOLITE

The Martens et al technique, op. cit., was used to prepare the basic zeolite.

NaY crystalline zeolite powder (LZY-52) was supplied by Union Carbide; it had a unit cell size of 24.7 Ångstrom units (2.47 nm) and a reported $SiO_2/Al_2O_3$ molar ratio of 4.74. Its sodium content was 2.4 wt.-%. The NaY powder was calcined in flowing $O_2$ (extra-dry grade) at 673 K for 2 hours, followed by evacuation ($10^{-3}$-$10^{-4}$ Torr) for 12 hours; $NaN_3$ (Fisher, reagent grade) was used as received. Reagent grade methanol was dehydrated by distillation from magnesium and sublimed iodine. Crystalline, ground $NaN_3$, 0.25 g/g of NaY, was dissolved in the methanol. Calcined NaY was then mixed with this solution, with continuous stirring at room temperature for 2 hours. The solvent was then removed by evacuation and the solid dried under vacuum for 12 hours. The sample was then transferred to a calcination tube in a $N_2$-filled glove box. Thermal decomposition of the $NaN_3$ thus introduced into the intracrystalline space of the zeolite was conducted as high purity $N_2$(99.999%) flowed through the sample, with the temperature ramped from 523 to 673 K at a rate of 1 K/min. The sample was maintained at 673 K for 4 hours, then cooled down. The resulting strongly basic zeolite sample was characterized by infrared absorption bands at 2186 (m), 2076 (s), 2036 (vs), and 1973 (m)cm$^{-1}$. It had a higher sodium content (about 7 wt.-%) than the untreated LZY-52 (2.4 wt.-%).

B. COMPARISON: PREPARATION OF ACIDIC ZEOLITE

The acidic zeolite (HY) was prepared by ion exchange of NaY with aqueous 0.1-N $NH_4Cl$ solution at 363 to 368 K. After ion exchange, the slurry was filtered, washed with sufficient deionized water to remove the remaining salt and dried in an oven at 393 K for 12 hours. The acidic form of the zeolite was formed by decomposition of the ammonium cations at 623 K, releasing $NH_3$. The resulting HY was calcinated at 723 K in flowing $O_2$ (extra-dry grade) for 4 hours, followed by evacuation at $10^{-3}$-$10^{-4}$ Torr for 12 hours.

C. PREPARATION OF METAL CARBONYL HYDRIDE $[H_2Os(CO)_4]$ was prepared by reduction of $[Os_3(CO)_{12}]$ with Na in liquid $NH_3$, followed by protonation of the resulting $Na_2Os(CO)_4$ with phosphoric acid in accordance with J. P. Collman et al, *Inorg. Chem.* 13, 1 (1974); see also F. L'Eptattenier et al, *Inorg. Chem.* 6, 2092 (1967) regarding the pruity of this product. The resulting [H₂Os(CO)₄] was then vacuum transferred from the aqueous solution through a $P_2O_5$ trap to a Schlenk tube which was immersed in a liquid $N_2$ trap. The resulting compound in hexane had infrared absorption bands at 2141 (w), 2067 (m), 2056 (s) and 2050 (vs) cm$^{-1}$. Its purity was confirmed.

D. PREPARATION OF ZEOLITE/METAL CARBONYL COMBINATION BY CHEMISORPTION OF METAL CARBONYL HYDRIDE ON BASIC ZEOLITE

Os Adsorption on HY Zeolite

[H₂Os(CO)₄] is a volatile compound at room temperature. Vapor-phase chemisorption was used to prepare a zeolite-supported Os catalyst. A 250-mL flask with 2.5 grams of pretreated zeolite support was connected through a T-stopcock to a Schlenk tube containing volatile [H₂Os(CO)₄]. The flask and the Schlenk tube were immersed in liquid $N_2$ traps. The flask and a connecting line provided with two stopcocks to isolate the connecting line from the Schlenk tube and from the flask, were evacuated for 2 hours before adsorption, with [H₂Os(CO)₄] confined to the Schlenk tube by the low temperature and by isolating the Schlenk tube from the connecting line. After that, connecting line stopcocks were opened to provide a path from the Schlenk tube to the flask. The liquid $N_2$ trap was removed from the Schlenk tube to allow [H₂Os(CO)₄] to transfer in-vacuo from the Schlenk tube to the flask and adsorb on the zeolite in it. After the transfer of [H₂Os(CO)₄] to the flask, the flask was isolated from the system and the liquid $N_2$ trap was removed from the flask. The isolated flask was held at room temperature for 24 hours during which the flask was shaken by hand from time to time to allow mixing. Following the adsorption, the flask was evacuated for 1 hour to remove excess [H₂Os(CO)₄] before the resulting sample was unloaded and stored in an $N_2$ glove-box.

Samples with different Os loadings were made.

Attempts were made to extract supported organometallics from the zeolites with acetone (or other solvents) and [PPN][Cl]. Acetone (reagent grade) was dried over activated 4A molecular sieves and stored under nitrogen. [PPN][Cl] was used as received.

Samples with different loadings of Os on acidic zeolite (HY) were also made by room temperature vapor phase adsorption in the manner described above. An osmium content of 7.2 wt.-% was selected as typical of the HY-supported catalysts.

Examples of the catalyst of this invention and a comparative Example were thus found to have the following Os content levels (the analyses were done by X-ray fluorescence spectroscopy):

Os Content In Examples of Invention And Comparative Example,

| Example | Os Content, wt.-% |
|---|---|
| C-1 (Comparative Example, HY-supported) | 7.2 |
| 1 | 10.6 |
| 2 | 10.6 |
| 3 | 8.9 |
| 4 | 10.6 |

For industrial practice, Os loadings <10 wt.-% are preferred, e.g. any catalytically effective amount up to about 8 wt.-% (more preferably <5 wt.-%).

In the Tables which follow, experimental results are tabulated, and, where appropriate for comparison, data from the scientific literature are given.

These Tables are summarized below.

Table I: Composition of products of Fischer-Tropsch synthesis using a commercial catalyst. Source: H. Pichler et al, *Herstellung Fluessinger Kraftstoffe aus Kohle*, Gersbach & Sohn, Munich, Germany.

Table II. Activities and Selectivities of zeolite-supported metal catalysts for CO hydrogenation. Sources: Example 3 (experimental), H. H. Lamb et al, *J. Am. Chem. Soc.* 108, 81 (1986) and *Proc. 9th Int. Congr. Catal.* 3 1378 (1988); D. Fraenkel et al, *J. Am. Chem. Soc.* 102, 2478 (1980); L. F. Nazar et al *J. Mol. Catal.* 21, 313 (1983), H. H. Nijs et al, *J. Chem. Soc. Chem. Commun.* 180, 1095 (1979).

Table III. Activities and selectivities of Catalyst of this invention compared to HY-supported catalyst. Source: Examples 1 and C-1 (experimental).

Table IV. Activity and selectivity of catalyst of this invention. Source: Example 2 (experimental).

Table V. Effect of feed gas on catalyst performance. Sources: Examples 3 and 2 (experimental).

Table VI. Metal content of catalyst after use compared to before-use content. Source: Examples 1-4 and C-1 (experimental).

E. Characterization Techniques Before and After Use in Catalysis

The Os and Na contents of the resulting samples and the used samples were determined by X-ray fluorescence (XRF) spectroscopy with a Philips PW 1410/80 automated X-ray spectrometer calibrated with similar standards.

Diffuse Reflectance Infrared Fourier Transform Spectroscopy (DRIFTS) was used with a Nicolet 7199 instrument having a spectral resolution of 4 cm$^{-1}$ to record spectra of fresh and used samples. The powder samples were loaded into the DRIFTS cell in the glove-box. The cell was connected to a vacuum/gas-handling manifold for in-situ treatment. Reactions were carried out in the cell.

X-ray powder diffraction (XRD) spectrometry to measure crystal structures was carried out with Philips APD 3520 instrument.

Electron micrographs of fresh and used catalysts were taken with Philips 400T instrument in transmission mode (TEM).

E. (1): CHARACTERIZATION BEFORE USE

The highest Os loading measured with XRF was 10.6 wt% for catalysts of this invention (Examples 1, 2, and 4) and 7.2 wt% for the HY support. The initially gray basic zeolite derived from MY turned yellow after the adsorption of H₂Os(CO)₄], but the initially white HY did not change color after adsorption of [H₂Os(CO)₄].

Freshly prepared catalysts made acccording to sections A, C, and D, above, were characterized by a Philips 4007 transmission electron microscope (TEM) at 80 kev and were found to have uniformly dispersed scattering centers smaller than 10 Angstrom units (1 nm). Freshly prepared Example C-1 catalyst (HY-supported) was characterized by infrared bands at 2139 (w), 2108 (w), 2076 (vs), 2036 (s), 1989 (m) and 1961 (w, sh) cm$^{-1}$.

Infrared spectra characterized the metal carbonyl species in the zeolites. The spectra of the zeolite supports were subtracted from the spectra of the Os-containing samples. The infrared spectra of basic-zeolite- and HY-supported samples are clearly different from the spectrum of the precursor [H$_2$Os(CO)$_4$] in hexane and clearly different from each other. The infrared spectrum of the MY-supported Os sample, 2082 (w), 2056 (s), 2024 (s), 1993 (vs) and 1963 (m, sh) cm$^{-1}$, by comparison with the spectrum of [H$_2$Os(CO)$_4$] shows a broadening and a shift of the strongest CO band to lower frequency, suggesting that deprotonation of [H$_2$Os(CO)$_4$] took place on the basic surface, reference is made here to P.S. Braterman, *Metal Carbonyl Spectra*, Academic Press Inc., New York, N.Y., 1975. These results derived from the color of the newly made MY-supported samples and their infrared spectra suggest the formation of a mixture of anionic species on the basic zeolite surface. The bands at 2082 (s), 2024 (s), 1993 (vs) and 1963 (m) cm$^{-1}$ are in good agreement with those of [Me$_4$N][HOs$_3$(CO)$_{11}$] in CH$_2$Cl$_2$(2083(w), 2020 (s), 1996 (2), 1958 (m) and 1667 (w, br) cm$^{-1}$), reported in C. R. Eady, *J. Chem. Soc. Chem. Commun.* 1976, 602. For comparison, the spectrum of [H$_3$Os$_4$(CO)$_{12}$]-supported on MgO is 2085 (m), 2029 (s), 2008 (s), 1988 (s), 1967 (m, sh) and 1948 (m, sh) cm$^{-1}$.

In contrast, the spectrum of the HY-supported osmium carbonyl has infrared bands at 2139 (w), 2108 (w, sh), 2076 (vs), 2035 (s), 1989 (m) and 1961 (w) cm$^{-1}$. The strongest band was shifted to a higher frequency compared with that of [H$_2$Os(CO)$_4$]. Thus it appears that different Os carbonyl species were formed from the adsorbed [H$_2$Os(CO)$_4$] on the basic zeolite and on the acidic zeolite.

In attempts to isolate the surface-bound Os species from the zeolite supports, the samples were extracted under N$_2$ with acetone and with an excess of [PPN][Cl] in acetone. The attempts failed to give evidence of any extraction with the MY-supported sample; the supernatant solutions were colorless, and no extracted species could be detected by infrared spectroscopy. After the attempted extraction, the solid samples prepared from the basic zeolite remained yellow, and their infrared spectra were identical to those observed prior to the attempted extraction. The infrared results suggest that adsorbed [H$_2$Os(CO)$_4$] was deprotonated by the basic zeolite support, NaN$_3$-treated MY, the newly formed species possibly being tightly ion-paired with the basic MY surface or possibly having formed structures large enough to be entrapped in the zeolite cages.

In contrast, when the HY-supported sample, with an Os loading of 7.2 wt% (Example C-1) was extracted with acetone, the resulting supernatant solution was characterized by infrared bands at 2094 (m), 2067 (m, sh) 2054 (vs), 2048 (vs), and 2018 (m, sh), which are similar to those characteristic of [H$_2$Os(CO)$_4$] in hexane, indicating that the [H$_2$Os(CO)$_4$] was only physisorbed on HY.

The observation of yellow color and the characteristic infrared bands of the basic zeolite-supported Os catalysts of this invention is attributed to the intrazeolite surface chemistry. This yellow color is also present in catalysts after use in CO hydrogenation and is in that case suggestive of triosmium or tetraosmium carbonyl clusters, both of which are yellow.

E. (2) Use In Catalysis of CO Hydrogenation

Kinetics measurements were carried out with a Cu-lined flow reactor having an inner diameter of ¼ inch (6.35 mm). Typically, 0.5-1.0 g of zeolite-supported catalyst was loaded into the isothermal zone of the reactor in the N$_2$-filled glove-box; the upstream and downstream sections were packed with glass wool. The UHP gases were purified by passage through traps containing activated 5A zeolite; the H$_2$ also flowed through a Cu$_2$O trap. An activated carbon trap held at 548 K was used to decompose any metal carbonyl impurities in the CO feed. The CO hydrogenation reaction was investigated at various temperatures (573-638 K), pressures (1-30 bar), and feed compositions (molar ratio of H$_2$ to CO varied from 0.3 to 9). Conversions ($<2\%$) were measured as a function of time on stream for periods as long as a few weeks to provide data characterizing catalyst deactivation. The effluent stream flowed through a heated line to prevent condensation of products, which were analyzed by an on-line Antek 300 gas chromatograph equipped with a Porapak Q column (1.219 m in length and 3.175 mm in inner diameter) and a flame ionization detector. At the conclusion of each experiment, the catalyst was cooled to room temperature in flowing reactants, removed from the reactor in the N$_2$-filled glove-box and characterized by the spectroscopies mentioned above.

In a series of trials, 0.5-1.0 gram of zeolite-supported catalyst prepared from the adsorption of [H$_2$Os(CO)$_4$] on either basic zeolite or HY supports was loaded into the flow reactor without any pretreatment. The catalyst (which was not allowed to contact air or moisture) was brought on stream under a mixture of flowing equimolar CO and H$_2$ and pressurized to the desired reaction pressure. The catalyst was then heated to the desired temperature at a rate of 2 K/min. Time zero on stream was defined as the time when this temperature was reached. The catalytic activity as a function of time on stream was calculated from the conversion data. Activity is expressed by reaction rate (mol of hydrocarbon products/mol of Os·s) or (mol of CO converted to hydrocarbons/mol of Os·s). The initial Os loading of the catalyst was used in the calculations. The activity of the zeolite support was subtracted in the calculation of reaction rate (unless otherwise noted); the correction was at most 30%.

The two kinds of the Os-containing catalyst, basic zeolite-supported catalysts of this invention (Examples 1-4) and HY-supported catalysts (represented by Example C-1) exhibited activity for CO hydrogenation at temperatures exceeding 573 K. Both kinds were selective, with a cutoff at C$_5$ chain length, but otherwise the performance of the two was markedly different. The basic zeolite-supported Os catalyts of Examples 1-4 displayed good selectivity toward production of C$_2$-C$_4$ alkenes and good stability in CO hydrogenation reactions.

A temperature of $\gtrsim$573 K resulted in observation of the activity of the catalyst- of the invention. The reaction rate at 573 K and 19 bar with a H$_2$/CO molar ratio of 1 was 0.8·10$^{-5}$ (mol of CO converted to hydrocarbons/mol of Os·s). Under these moderate conditions, a catalyst of this invention was kept on stream for >20 days, and its catalytic activity and selectivity changed only moderately. Compared to conventional Fischer-Tropsch catalyst (see Table 1), the MY-supported Os catalysts selectively gave higher yields of C$_2$-C$_4$. hydrocarbons with high alkene/alkane ratios. At steady state, the yield of $C_2$-$C_4$ hydrocarbons obtained with catalyst of this invention at moderate conditions was as high as 60% (molar) of the hydrocarbon product; the alkene/alkane ratios for $C_2$, $C_3$, $C_2+$ were >4. No $C_4$ and $C_5$ alkanes were detected in the $C_4$ and $C_5$ products. The product distribution under these moderate conditions evidently deviates from the conventional Schulz-Flory pattern; cf. Table I. After 20 days on stream, the catalyst removed from reactor was still yellow with no visible indication of metallic Os, suggesting the presence of predominantly Os clusters rather than metal particles, which was confirmed later by IR and TEM analyses. The total moles of CO converted to hydrocarbons during 20 days operation was 15.3 mol/mol of Os. The 20-day-old catalyst was extracted with dried hexane, and no hydrocarbon signals (except the solvent) were detected by gas chromatography. These results confirm the catalytic nature of the reaction and the absence of hydrocarbons in the zeolite pores that might have been expected to contribute to the remarkable selectivity.

The HY-supported Os catalyst (Example C-1) showed markedly different behavior in CO hydrogenation. Upon heating to 473 K, a detectable catalytic activity was recorded, but it was too low to measure accurately. The initial reaction rate at 573 K and 19 bar with a $H_2/CO$ molar ratio of 1 was $5 \cdot 10^{-5}$ (mol of CO converted to hydrocarbons/mol of Os·s, but it dropped very quickly with time on stream. The product distribution also changed with time on stream, and at steady state at 620 K (with a reaction rate of $8 \cdot 10^{-5}$ (mol of CO converted to hydrocarbons/mol of Os·s), a typical Schulz-Flory product distribution was obtained, with the yield of methane being as high as 90 mol%, which is about 30% higher than characteristic of the catalysts of this invention (Table III). In contrast to the performance of the catalysts of this invention, there were no alkenes observed in the products; rather, the alkene hydrogenation was evidently rapid, as evidenced by the observation that the trace amounts of alkenes that were produced with the HY support alone disappeared with time as the process was continued.

The excellent stability and reproducibility of catalysts of this invention created a good opportunity for a detailed investigation of the kinetics of CO hydrogenation. The effects of space velocity, pressure, temperature and feed composition on catalytic performance were investigated under near-steady-state conditions, with experimental runs conducted for CO conversions between 0.1 and 2.0%. The standard conditions were chosen to be 573 K, 19 bar, space velocity=20 (or 10) mL/g of catalyst/min, and $H_2/CO$ feed molar ratio=1. Following each variable change, the catalyst was tested again at the standard conditions. The resulting results indicated that the kinetics study was conducted under near-steady-state conditions, i.e., in the virtial absence of catalyst deactivation.

The effect of space velocity on the steady-state conversion was determined with the catalysts of this invention. The conversion to hydrocarbons was observed to be proportional to the inverse space velocity, demonstrating that the conversions were differential.

Catalytic activity was dependent on reaction temperature. The apparent activation energies (calculated from the temperature dependence of the rate) are 55.3, 36.3, 52.2, 30.1, 44.6, 29.5, 40.6 kcal/mol for methane, ethylene, ethane, propylene, propane, $C_4$ alkene, and $C_5$ alkene, respectively. A temperature increase from 573 to 628 K led to a 16-fold increase in CO conversion. As shown in Table IV, even after the catalyst of Example 2 had been used continuously at 638 K for 200 h, no significant activity loss and only a small selectivity change were measured. Evidently the catalytically active Os species in the MY zeolite support are quite stable at the temperatures used and tolerant of frequent changes in the process variables. This conclusion was confirmed later by the characterization of the used catalysts, as described below.

The pressure was important to stable performance of the catalysts of this invention. Several experimental runs suggest that a pressure of at least about 11 bar was needed for stable catalytic performance. When a catalyst of this invention was operated at atmospheric pressure, there was marked deactivation observed at each reaction temperature. But when the pressure was increased to 11 bar, the deactivation became very slow; there was no measurable loss of catalytic activity and no measurable change in selectivity in 30 hours of continuous operation. These results suggest that high partial pressures $CO+H_2$ stabilized the entrapped Os carbonyl clusters, which it is assumed are precursors of the catalytically active species or catalytically active themselves in the CO hydrogenation. As expected, increasing pressure of $CO+H_2$ led to increasing CO conversions and decreasing of alkene/alkane ratios, corresponding to higher rates of alkene hydrogenation. The alkene/alkane ratio for $C_2$ dropped more sharply than that for $C_3$ with increasing pressure.

The dependence of catalyst performance on feed-gas composition is summarized in Table V. The reaction rate is approximately proportional to the $H_2/CO$ molar ratio in the range 0.3–3.0. The selectivity to alkanes increased with increasing $H_2/CO$ molar ratio. Nonetheless, an unusually high selectivity for alkenes characteristic of the basic zeolite-supported catalyst (in this case Examples 2 and 3) was evident even at high $H_2/CO$ ratios.

One of the catalysts of this invention (Example 2, see Table V) was treated twice at 593 K and 19 bar with a $H_2/CO$ molar ratio of 9 for 24 hours, the goal being to determine the effect of high $H_2$ partial pressures. After each treatment, the catalyst was brought back to standard conditions with a $H_2/CO$ molar ratio of 1 and retested. The activity immediately following was 10 times higher than that observed before treatment. Further, the activity declined rapidly during the 48 hours of continuous operation following the treatment. The used catalyst removed from the reactor was black at the upstream end of the catalyst bed, suggesting that Os metal particles had formed on the zeolite outer surface after treatment at high $H_2$ partial pressure. These results demonstrate that a minimal CO partial pressure is necessary to provide catalyst stability.

E. (3): Characterization of Catalysts After Use

All the used catalysts of this invention (except for Example 2 after use at the 9:1 $H_2$:CO ratio) were still yellow when removed from the reactor; there was no visible indication of metallic Os particles on the supports. In contrast, the used HY-supported catalyst of Example C-1 was light gray.

Catalysts of this invention (Examples 1-3) after use were characterized by Philips 400T transmission electron microscope which worked at 80 Kev. Copper grids coated with light carbon film were used to hold the samples. The used catalyst (Example 3) which was on stream at 573 K, 19 bar with $H_2/CO=1$ (molar) for 20 days gave a few Os aggregates ranging in diameter from ca. 60-100 Å (6-10 nm) on the outer surface of zeolite crystallites. The Example 1 catalyst after use gave nearly identical image as that observed for used Example 3. In use, the Example 1 catalyst had been subjected to 573-628 K higher temperature treatment during 200 hours of continuous operation. This suggests that the basic zeolite-entrapped Os carbonyl species is stable at high temperature and resistant to sinterring. In contrast, many scattering centers believed to be large Os particles were observed on the outer surface of zeolite crystallites of the used catalyst of Example 2, which was treated twice with high $H_2$ partial pressure. The average particle size of Os was ca. 600 Angstrom units (60 nm), but the particles were not detected by XRD. This indicates that the Os particles observed by TEM consisted of aggregates of small particles. These results suggest that under high $H_2$ partial pressure, the basic zeolite-entrapped Os carbonyl species had broken into fragments which migrated out through the apertures of the zeolite support. On the outer surface of zeolite support the thus-migrated fragments apparently formed large aggregates which catalyze the CO hydrogenation reaction to give a traditional Schulz-Flory distribution. The catalytic performance of the catalyst Example 2 after treatment with high $H_2$ partial pressure was thus in good agreement with the TEM observations.

The XRD spectra were measured with a Philips APD 3520 instrument operated at 45 Kev and 40 mA. A specially designed inert atmosphere cell was used, keeping samples from exposure to air and moisture. The XRD spectra demonstrated that the crystal structure of zeolite supports of the used catalysts was not changed. No XRD peaks of Os crystallites (or oxides) were detected by XRD.

The Os and Na contents of the used catalysts were measured by X-ray fluorescence analysis (XRF). The results are listed in Table VI. The catalysts listed in Table VI (except Example 4) were brought on stream by the procedure described above; they were first pressurized in flowing $CO+H_2$ then heated to reaction temperature. The Example 4 catalyst was instead first used at atmospheric pressure for 123 hours before being pressurized.

It is apparent that the catalyst of Example 4 brought on stream at atmospheric pressure lost 12.8% of its Os within a period of 173 hours, which is almost twice as high as the loss from the catalyst of Example 1. It is inferred that the greater Os loss was responsible for a rapid deactivation observed in the catalytic testing by the Example 5 catalyst. The lesser Os losses of the used catalysts 3 of Examples 1-3 are attributed to the higher density of CO (and possibly H) ligands provided by the gas-phase reactant stream because these two catalysts were pressurized before being brought to high temperature. These results suggest that CO (and possibly H) ligands stabilized the zeolite-entrapped Os carbonyl clusters. But the catalyst of Example 4 did not have as much benefit of this stabilization.

The effect of ionic bonding of the osmium species to the zeolite supports on Os loss is apparent when results of Examples 1-3 are compared with results for the HY-supported catalyst of Comparative Example C-1. As evidenced by the infrared spectrum, $[H_2Os(CO)_4]$ was only physisorbed on the HY of the Example C-1 catalyst. The physisorbed $[H_2Os(CO)_4]$ molecules were presumably desorbed while being heated, leading to 13% Os loss within 56 hours of continuous operation at 19 bar (the system was pressurized to 19 bar before being heated).

Lamb et al, op. cit. (e.g. J. Am. Chem. Soc. 108, 81 [1986]) reported that 36% of the Os had been lost from their MgO-supported Os cluster catalyst (prepared by adsorption of $[H_2Os(CO)_4]$ on MgO) during 2 days of operation. The MgO-supported Os cluster catalyst was brought on stream with equimolar $H_2/CO$ flowing and then pressurized to 10.5 bar before being heated. CO hydrogenation was catalyzed by the catalyst at 545 K, 10.5 bar with an $H_2/CO$ molar ratio of 3. Although this operating procedure was similar to that used for the catalysts of Examples 1-3, the Os loss was much higher than that measured for the Examples 1-3 catalysts (Table VI). The basic zeolite-supported catalysts are therefore considered much more resistant to Os loss. Although this invention is not bound by any theory, it is inferred that large Os clusters form in the basic zeolite cages during the reaction and the small apertures (diameter=0.8 nm) hindered their transport; the clusters were thus stably entrapped.

The nature of the deactivation is clarified by the characterization data. As illustrated by the infrared results, $[H_2Os(CO)_4]$ molecules were initially physisorbed on the HY support (Example C-1). This volatile compound evidently evaporated while the catalyst was heating in the reactor. XRF data (listed in Table VI) support this conclusion: although the HY-supported catalyst (Example C-1) was brought on stream at a relatively high pressure (19 bar) and operated at the same pressure, 13.3% of the Os had been lost after 56 hours; this amounts to a much higher rate of Os loss than the values observed for the catalysts of Examples 1-3. It can be inferred that the initial rapid deactivation of the Example C-1 catalyst is at least in part an indication of Os loss.

The sodium content levels of the catalysts of Examples 1-3 were about 7 wt%, much higher than those of the parent zeolite (see section E[1]). As shown in Table VI, some of the sodium introduced by thermal decomposition of the $NaN_3$ impregnating agent was lost during the catalysis. Also it could be seen that the higher the operating temperature the greater the sodium loss; compare Example 3 with Examples 1 and 2. The results do not indicate any loss of sodium ions from the zeolite framework itself.

The used catalysts were examined by DRIFTS (see the introduction to section E, above) after removal from the reactor. A comparison of the spectra of unused and used catalysts of Examples of this invention and the Comparative Example shows that the organoosmium precursor was transformed during catalysis. After the fresh basic-zeolite-supported catalyst had been treated with an equimolar mixture of $H_2+CO$ at 473 K and 19 bar for 10 hours, a new spectrum was determined and was found to have infrared bands at 2190 (w), 2083 (w), 2054 (s), 2024 (s), 1989 (vs), 1969 (m, sh) and 1923 (m) $cm^{-1}$. The only difference between the two spectra was the appearance of a sharper 2024-$cm^{-1}$ band in the used catalyst spectrum. Under these conditions, the catalyst was inactive for CO hyrogenation. A significantly different infrared spectrum having bands at 2171 (w), 2086 (w), 2024 (w, sh) 1974 (m, sh) and 1947 (vs) $cm^{-1}$, was recorded after the fresh catalyst had been treated at a higher temperature (573 K), 19 bar with a $H_2/CO$ molar ratio of 1. As a result of the catalytic reaction under these conditions, $C_1-C_5$ hydrocarbon products were detected in the effluent stream, and a good stability both in catalytic activity and selectivity was observed. These results suggest that the newly formed Os carbonyl species on the basic zeolite support were active for CO hydrogenation and stable under the reaction conditions. This suggestion is confirmed by the observation that an identical infrared spectrum was recorded for two used catalysts of this invention (Examples 1 and 2). Example 1 had been run at high temperatures ranging from 573 K to 628 K for 200 hours. The Example 2 catalyst had been on stream for 440 hours and had been run at 638 K for 200 hours without activity loss or significant selectivity change (Table IV). These results reflect the stability of the species formed at 573 K after a long time of catalyst operation at high temperature in the presence of $CO+H_2$.

The fresh HY-supported catalyst of Example C-1 was characterized as described in section E(1), above. After the fresh sample was treated with an equimolar $H_2+CO$ mixture at 19 bar and 473 K (or 628 K), a new species was formed, as evidenced by the infrared spectra of the resulting solids. The spectra of these two resulting samples are virtually identical, indicating that the formation of the catalytic active species started at about 473 K and that they were stable at temperatures up to 628 K.

Extractions of the used catalysts were attempted with [PPN][Cl] in acetone. The catalysts of Examples 1, 3, and 4 were yellow. After extraction, the samples remained the same color. No carbonyl species were detected in their colorless supernatant solutions by infrared spectroscopy. In contrast to the results for the unused sample, the attempt to isolate the surface-bound species from the used HY-supported catalyst of Example C-1 with [PPN][Cl] in acetone (or other solvents) was unsuccessful. This result indicates that the newly formed Os carbonyl species were entrapped in the HY supercages. The dimensions of the newly formed osmium species were evidently larger than the apertures of the zeolite, so that they were prevented from migrating out of the zeolite and were stable catalysts after the loss of volatile physisorbed $[H_2Os(CO)_4]$ had taken place.

The monoosmium carbonyl hydride $[H_2Os(CO)_4]$ has an octahedral structure similar to that of $Os(CO)_6$:

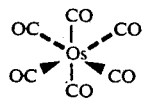

and is about 6 Ångstrom units (0.6 nm) in diameter The carbonyl hydride complex is therefore smaller than the aperture opening into the supercage of zeolite Y, hence the complex can diffuse into these supercages and form a highly dispersed species on the zeolite surface.

A triosmium or tetraosmium species is not small enough to diffuse into such a supercage but is small enough to fit inside, if formed in situ within the supercage from a smaller species. Estimated dimensions for $[H_2Os_3(CO)_{10}]$ and $[H_2Os_3(CO)_{11}]$, both of which have triangular metal framework structures

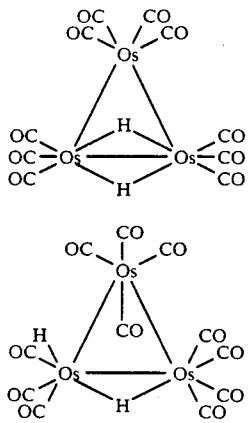

are about 8.9 Ångstrom units (0.89 nm) in maximum diameter, assuming $RO_{s-Os}=2.82$ Å and $RO_{s-O^*}=3.02$ Å ($O^*$ represents the oxygen atom of the CO ligand). A similar longest dimension is estimated for $[H_4Os_4(CO)_{12}]$, which is a tetrahedron.

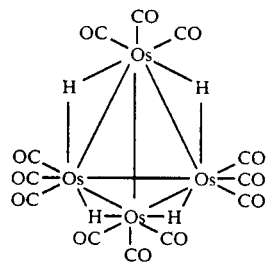

This tetrahedron is believed to be 7.23 Ångstrom units (0.723 nm) in height. It too could fit inside a zeolite Y supercage. The octahedral $[Os_5(CO)_{15}]^=$ and the large $[Os_{10}C(CO)_{24}]^=$ ions are on the other hand, too large to fit into a zeolite Y supercage, hence it is theorized that penta- and decanuclear Os carbonyl complexes could not be formed in situ in the supercages. (The volume of a supercage is about 900 cubic angstrom units = about 0.9 $nm^3$.) These theoretical considerations are consistent with the foregoing after-use characterization data.

TABLE I

| Composition of the products obtained with commercial catalyst (in wt %) | |
|---|---|
| Fraction | wt % |
| $C_3-C_4$ | 5.6 |
| $C_5-C_{11}$ (gasoline) | 33.4 |
| Gas oil | 16.6 |
| Alkane m.p. <60° C. | 22.1 |
| Alkane m.p. 95–97° C. | 18.0 |
| Oxygenated compounds | 4.3 |

Reaction conditions: T = 493–513K,
P = 25 bar
$H_2/CO$ = 1.8 (molar).
(After Pichler et al)

TABLE II

ACTIVITIES AND SELECTIVITIES OF ZEOLITE-SUPPORTED METAL CATALYSTS FOR CO HYDROGENATION

| Metal | Reaction Conditions | | | Product Distribution, |
|---|---|---|---|---|
| | | $H_2/CO$ | CO con- | |

TABLE II-continued

ACTIVITIES AND SELECTIVITIES OF ZEOLITE-SUPPORTED METAL CATALYSTS FOR CO HYDROGENATION

| CATALYST | Content wt.-% | T, K | P, bar | mol ratio | version % | mol % | | | | | | | Olefin/Paraffin Molar Ratio | | | Time On Stream Hours | Hydro-Carbon Range | Notes |
|---|---|---|---|---|---|---|---|---|---|---|---|---|---|---|---|---|---|---|
| | | | | | | $C_1$ | $C_2$ | $C_3$ | $C_4$ | $C_5$ | $C_6$ | $C_7$ | $C_2$ | $C_3$ | Total | | | |
| Example 3 | 8.9 (Os) | 573 | 19 | 1 | 0.11 | 31.4 | 34.7 | 18.5 | 13.6 | 1.9 | — | — | 3.5 | 6.3 | 1.45 | 48 | $C_1$-$C_5$ | a |
| | | | | | 0.11 | 46.8 | 23.8 | 11.8 | 14.9 | 2.6 | — | — | 7.4 | 5.1 | 0.94 | 480 | $C_1$-$C_5$ | b |
| | | 628 | 19 | 1 | 1.82 | 67.4 | 18.5 | 7.3 | 5.3 | 1.4 | — | — | 4.0 | 4.8 | 0.38 | 200 | $C_1$-$C_5$ | c |
| H. H. Lamb et al (Os carbonyl hydride in MgO) | ~1.9 (Os) | 548 | 10 | 3 | <0.7 | 90 | >.2 | 1.8 | 0.09 | — | — | — | — | — | — | 5 | $C_1$-$C_4$ | d |
| D. Fraenkel et al (Co ion-exch, zeolite A, reduced with Cd) | NR* | 424 | 6 | 1 | ~1 | — | — | — | — | — | — | — | — | — | — | — | — | e |
| | | 455-473 | 6.2 | 1 | NR* | — | — | 100 | — | — | — | — | — | 7 | — | <5 | $C_3$ only | — |
| | | 560 | 6.4 | 1 | NR* | 80.5 | 12.8 | 5.5 | 1.3 | trace | — | — | 0.44 | 1.2 | 0.08 | — | $C_1$-$C_5$ | — |
| D. Fraenkel et al (Co ion exch, zeolite Y, reduced with Cd) | NR* | 455 | 6.5 | 1 | >15 | 56.6 | 4.3 | 3.8 | 18.3 | 11.0 | 5.0 | 0.9 | 0.43 | 0.58 | 0.05 | NR* | $C_1$-$C_7$ | |
| L. F. Nazar et al (Fe in toluene from metal vapor, NaY zeolite) | 0.5 (Fe) | 527 | 1 | 2 | 0.15 | 19 | 2 | 9 | 47 | 23 | — | — | — | — | — | ≦0.1 | $C_1$-$C_5$ | |
| | | 573 | 1 | 2 | 0.10 | 50 | 8 | 9 | 15 | 18 | — | — | — | — | — | ≦0.1 | $C_1$-$C_5$ | |
| L. F. Nazar et al (Co in toluene made from metal vapor, NaY zeolite) | 2.4 (Co) | 520 | 1 | 2 | 0.02 | 25 | 0 | 5 | 70 | 0 | — | — | — | — | — | 60 | $C_1$-$C_4$ | |
| | | 563 | 1 | 2 | 0.04 | 68 | 19 | 9 | 3 | 1 | — | — | — | — | — | 60 | $C_1$-$C_5$ | |
| H. H. Nijs et al | 5.79 (Ru) | 525 | 14.2 | 1.5 | 12 | — | — | — | — | — | — | — | — | — | — | 1 | $CC_1$-$C_{11}$ | Schulz-Flory |
| Ru/Nay | 2.0 (Ru) | 525 | 14.2 | 25 | 34 | 5 | 6 | 20 | 34 | — | — | — | — | — | — | 1 | $C_1$-$C_5$ | Distri- |

TABLE II-continued

ACTIVITIES AND SELECTIVITIES OF ZEOLITE-SUPPORTED
METAL CATALYSTS FOR CO HYDROGENATION bution

*NR = not reported.
Notes a through e: reaction rate in moles of hydrocarbon/mole of metal-sec
a. $3.7 \times 10^{-6}$, b. $4.1 \times 10^{-6}$, c. $1.21 \times 10^{-4}$, d. $1.5 \times 10^{-4}$, e. $1.3 \times 10^{-4}$.

TABLE III

| Catalyst of Example | Os content, wt % | Time on stream h | Reaction conditions | | | | $10^5 \cdot$ Reaction Rate$^c$ | CO conversion, % | Selectivity, mol % | | | | | Alkene/alkane | | |
|---|---|---|---|---|---|---|---|---|---|---|---|---|---|---|---|---|
| | | | T, K | P, bar | SV$^a$ | H$_2$/CO$^b$ | | | C$_1$ | C$_2$ | C$_3$ | C$_4$ | C$_5$ | C$_2$ | C$_3$ | C$_{2+}$ |
| C-1 | 7.2 | 57 | 620 | 19 | 20 | 1 | 8.3 | 0.92 | 93.1 | 3.8 | 2.1 | 1.0 | 0.3 | 0 | 0 | 0 |
| 1 | 10.6 | 173 | 613 | 19 | 20 | 1 | 10.3 | 1.0 | 61.6 | 20.7 | 9.3 | 6.7 | 1.7 | 4.1 | 4.5 | 5.7 |
| 1 | 10.6 | 195 | 628 | 19 | 20 | 1 | 18.7 | 1.8 | 67.4 | 18.5 | 7.3 | 5.3 | 1.4 | 4.0 | 4.8 | 5.6 |

$^a$Space velocity, mL/g of catalyst/min.
$^b$Molar ratio.
$^c$Reaction rate, mol of CO converted/mol of Os · s.

TABLE IV

Activity and selectivity of Catalyst of Example 2.

| Time on stream h | $10^5 \cdot$ Reaction rate | CO conversion, % | Selectivity mol % | | | | | Alkene/alkane molar ratio | | |
|---|---|---|---|---|---|---|---|---|---|---|
| | | | C$_1$ | C$_2$ | C$_3$ | C$_4$ | C$_5$ | C$_2$ | C$_3$ | C$_{2-}$ |
| 363 | 15.6 | 2.2 | 72.2 | 18.8 | 4.9 | 2.9 | 1.2 | 7.9 | 22.9 | 11.1 |
| 563 | 17.5 | 2.4 | 71.7 | 18.6 | 5.6 | 2.8 | 1.3 | 13.2 | — | 20.0 |

Reaction conditions: T = 638 K, P = 19 bar, H$_2$/CO = 1 (molar), SV = 20 mL/g of catalyst · min.

TABLE V

Effect of feed-gas composition on catalyst performance

| Catalyst of Example | Os content, wt % | Time on stream, h | Reaction conditions | | | | $10^5 \cdot$ Reaction rate$^c$ | CO conversion$^d$, % | Selectivity mol % | | | | | Alkene/alkane | | |
|---|---|---|---|---|---|---|---|---|---|---|---|---|---|---|---|---|
| | | | T, K | P, bar | SV$^1$ | H$_2$/CO$^b$ | | | C$_1$ | C$_2$ | C$_3$ | C$_4$ | C$_5$ | C$_2$ | C$_3$ | C$_{2+}$ |
| 3 | 8.9 | 148–152 | 573 | 19 | 10 | 0.3 | 0.86 | 0.08 | 54.5 | 18.2 | 11.9 | 13.2 | 2.1 | 6.3 | 9.5 | 11.5 |
| | | 168–192 | 573 | 19 | 10 | 1.0 | 1.4 | 0.20 | 55.5 | 19.4 | 11.1 | 12.1 | 1.9 | 3.1 | 5.0 | 5.8 |
| | | 170–175 | 573 | 19 | 10 | 3.0 | 2.5 | 0.67 | 64.8 | 18.1 | 8.9 | 7.5 | 0.7 | 1.5 | 2.6 | 2.7 |
| 1 | 10.6 | 630 | 593 | 19 | 20 | 1 | 2.1 | 0.29 | 71.0 | 16.5 | 6.1 | 4.9 | 1.5 | 3.1 | 4.5 | 4.7 |
| | | 645 | 593 | 19 | 20 | 9 | 4.5 | 0.62 | 84.8 | 9.8 | 2.9 | 1.9 | 0.6 | 1.7 | 2.2 | 2.3 |

$^a$Space velocity, mL/g of catalyst · min.
$^b$Molar ratio.
$^c$Reaction rate, mol of CO converted/mole of Os · s.
$^d$The activity caused by zeolite support was not subtracted in the calculation.

TABLE VI

Metal contents levels in fresh and used catalysts

| Catalysts of Example | Os content, wt % | | Os loss, % | Na content, wt % | | Na loss, %z | Total time on stream, h | Reaction temperature, K | Pressure, bar | |
|---|---|---|---|---|---|---|---|---|---|---|
| | fresh | used | | fresh | used | | | | initial | operating |
| 3 | 8.9 | 8.4 | 6.5 | 7.5 | 6.6 | 11.7 | 480 | 573 | 19 | 19 |
| 1 | 10.6 | 10.1 | 5.8 | 7.0 | 4.6 | 34.6 | 200 | 573–628 | 19 | 19 |
| 2 | 10.6 | 8.6 | 14.5 | 7.0 | 5.3 | 24.3 | 440 | 573–638 | 19 | 19 |
| 4 | 10.6 | 9.3 | 12.8 | — | — | — | 173 | 573–617 | 0 | 0, 19 |
| C-1 | 7.2 | 6.2 | 13.3 | 2.8 | 3.1 | — | 56 | 573–617 | 19 | 19 |

We claim:

1. A basic-molecular sieve-supported transition metal carbonyl-containing catalyst for catalyzing a reaction of or between carbon- and hydrogen-containing species, said catalyst comprising:
a basic molecular sieve containing supercages and said supercages having openings therein, said supercages having diameters in the range of about 1 to about 2 nm, and the openings in said supercages having internal diameters in the range of about 0.5 to about 1.4 nm, said molecular sieve having been rendered basic by the thermal decomposition of NaN$_3$ in situ within the molecular sieve structure, and, entrapped within said supercages, a transition metal carbonyl species which, after heating of the transition metal carbonyl species in situ in the supercage to a temperature of at least about 250° C., has a shortest dimension which is greater than the diameter of the opening in the supercage in which it is entrapped and is resistant to decomposition to the transition metal at temperatures of at least about 250° C.

2. An NaN₃-treated basic-molecular sieve-supported Group VIII metal carbonyl-containing catalyst for catalyzing the reaction between CO or a carbonyl-containing compound and hydrogen or a hydrogen-containing compound, said catalyst comprising:
a molecular sieve which has been treated with an alkali metal azide which has been thermally decomposed within the molecular sieve structure to cause the molecular sieve to become a Brønsted base, said molecular sieve comprising supercages of uniform size with internal diameters in the range of about 1.0 to 1.5 nm and openings thereinto having a longest dimension of greater than about 0.6 nm but less than about 1.5 nm, and, entrapped within said supercages, Group VIII metal carbonyl species which essentially cannot be extracted from said molecular sieve, said Group VIII metal carbonyl species having been selected so as to become resistant under conditions of catalytic operation to decomposition to the Group VIII metal when heated under said conditions to at least about 250° C.

3. A molecular sieve-supported Group VIII metal catalyst according to claim 2, herein the Group VIII metal is osmium, and the Group VIII metal carbonyl species is anionic and is the reaction product of the components comprising [H₂Os(CO)₄] and the zeolite.

4. A molecular sieve supported Group VIII metal catalyst according to claim 3, wherein the molecular sieve is a shape-selective crystalline aluminosilicate having a faujasite structure comprising unit cells of an essentially cubic configuration which unit cells have a dimension of about 2.5 nm and contain 150 to 250 silica and alumina tetrahedra arranged in sodalite units having hexagonal faces, each sodalite unit in the structure being connected to four other sodalite units by six bridge oxygen atoms connecting the hexagonal faces of two sodalite units, hereby defining a supercage cavity with an internal diameter of about 1.2 nm and a 0.7 to 0.8 nm opening, bounded by six sodalite units, into this supercage cavity, the supercage volume representing at least about 40% of the total unit-cell volume.

5. A molecular sieve-supported Group VIII metal catalyst according to claim 4, wherein the molecular sieve is NaN₃-treated Y or NaY zeolite having an SiO₂/Al₂O₃ molar ratio of about 4.7 to 4.8.

6. A molecular sieve-supported Group VIII metal catalyst according to claim 2 wherein the Group VIII metal is osmium and the osmium loading on the molecular sieve support is a catalytically effective amount in the range of up to 8% by weight of the catalyst.

7. A molecular sieve-supported Group VIII metal catalyst according to claim 2 wherein the Group VIII metal carbonyl species is an osmium carbonyl species wherein the osmium carbonyl species forms, at temperatures above 250° C. in the presence of CO and H₂, a polynuclear cluster, and wherein the structure of the molecular sieve limits the size of said polynuclear clusters and also substantially prevents the clusters from migrating out of the zeolite when the catalyst is used to catalyze the hydrogenation of CO or the hydroformylation of an olefin.

8. A method for preparing a molecular sieve-supported transition metal catalyst, comprising the steps of:
(a) combining a shape-selective molecular sieve material with a solution of NaN₃ in a solvent, until NaN₃ is introduced into the intracrystalline space of the molecular sieve, evaporating the solvent, and then thermally decomposing the NaN₃, thereby obtaining a basic molecular sieve,
(b) introducing the vapor from a volatile transition metal carbonyl compound into said intracrystalline space, and
(c) interacting said vapor with the basic molecular sieve to obtain said molecular sieve-supported transition metal catalyst, at least until molecular sieve non-extractable transition metal carbonyl compound or anion or combination thereof is formed within said intracrystalline space.

9. A method according to claim 8, wherein the product of said step (a) is heated to at least 250° C. in an inert atmosphere or in the presence of reactive gases to form polynuclear clusters of transition metal carbonyl compounds or anions or combinations thereof within said intracrystalline space, said polynuclear clusters being too long in their shortest dimension to migrate from said intracrystalline space when the molecular sieve-supported transition metal catalyst is in use.

10. A method according to claim 9, wherein the product of said step (c) is heated to at least 250° C. in the presence of CO or H₂ and CO to form said polynuclear clusters within said intracrystalline space.

11. A method according to claim 8 which comprises:
introducing [H₂Os(CO)₄] vapor at ambient temperature into said intracrystalline space, and
forming a mono-osmium carbonyl anion by reaction with the basic molecular sieve, and
forming an anion containing at least three osmium atoms from said mono-osmium anion.

12. A method according to claim 8, wherein said molecular sieve material is a zeolite having a faujasite structure.

13. A method according to claim 8, wherein said volatile transition metal carbonyl compound is initially solidified by cooling and is subsequently volatilized by warming to a temperature above 0°.

14. A molecular sieve-supported transition metal catalyst made by the method of claim 8.

15. A method according to claim 8 which comprises:
introducing the vapor from a volatile transition metal carbonyl hydride into said intracrystalline space, and
forming a metal carbonyl anion by reaction with the basic molecular sieve, and
forming an anion containing a cluster of transition metals atoms from said metal carbonyl anion.

* * * * *